(12) United States Patent
Ichikawa

(10) Patent No.: US 7,641,033 B2
(45) Date of Patent: Jan. 5, 2010

(54) WET TYPE MULTI-PLATE CLUTCH

(75) Inventor: Kiyokazu Ichikawa, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 270 days.

(21) Appl. No.: 11/344,011

(22) Filed: Feb. 1, 2006

(65) Prior Publication Data

US 2006/0169567 A1    Aug. 3, 2006

(30) Foreign Application Priority Data

Feb. 2, 2005    (JP) ............................. 2005-026407

(51) Int. Cl.
*F16D 25/0638*    (2006.01)
(52) U.S. Cl. ............................. 192/85 AA; 92/165 PR
(58) Field of Classification Search .................. 192/35, 192/85 AA, 165 PR, 70.2; 92/165 PR
See application file for complete search history.

(56) References Cited

U.S. PATENT DOCUMENTS 2,825,236 A * 3/1958 Nabstedt et al. ............... 74/377
3,217,851 A * 11/1965 Mogk et al. .............. 192/85 AA
4,083,442 A * 4/1978 Ushijima .................... 192/54.3
4,502,582 A * 3/1985 Lech et al. ............... 192/85 AA
5,305,863 A * 4/1994 Gooch et al. ............. 192/70.12
5,752,810 A * 5/1998 Hein .......................... 417/319
6,021,878 A * 2/2000 Kosumi et al. ........... 192/89.23

FOREIGN PATENT DOCUMENTS

JP    (UM) 50-94345    8/1975
JP    (UM) 50-101747    8/1975

* cited by examiner

*Primary Examiner*—Richard M. Lorence
(74) *Attorney, Agent, or Firm*—Miles & Stockbridge P.C.

(57) ABSTRACT

The present invention provides a wet type multi-plate clutch comprising a first friction engaging element coaxially arranged within a clutch housing, a second friction engaging element alternately disposed with the first friction engaging element and a piston for applying an axial load to engage the first and second friction engaging elements with each other and wherein a projection protruding toward the piston is provided on the clutch housing and a recessed portion is provided in the piston so that a relative rotation between the clutch housing and the piston is prevented by engaging the projection with the recessed portion.

7 Claims, 2 Drawing Sheets

WET TYPE MULTI-PLATE CLUTCH

BACKGROUND OF THE INVENTION

1. Field of the Invention

The present invention relates to a wet type multi-plate friction engaging apparatus used in an automatic transmission of a vehicle and the like. More particularly, the present invention relates to a wet type multi-plate friction engaging apparatus including means for preventing a relative rotation between a clutch housing and a piston.

2. Related Background Art

In a wet type multi-plate friction engaging apparatus, a power is transmitted by engaging a plurality of friction engaging elements disposed within a clutch housing with each other. In order to apply an axial urging force to the friction engaging elements, a piston shiftable in an axial direction is provided within the clutch housing.

The piston is shifted in the axial direction by supplying oil pressure into an oil pressure chamber defined between the piston and the clutch housing, thereby tightening or engaging the friction engaging elements. In order to maintain the oil pressure chamber in a liquid-tight condition, an O-ring is provided on an outer periphery of the piston.

When the piston of the wet type multi-plate clutch is operated, the piston for tightening the friction engaging elements may be rotated by the rotation of the friction engaging elements. If the piston is rotated upon engaging the friction engaging elements, due to the rotation of the piston, the O-ring arranged around the piston may be damaged. Further, due to the rotation of the piston, a spring connected to the piston may be twisted to damage the spring. As a result, peripheral members may be damaged, thereby causing malfunction of the clutch.

In order to solve such problems, for example, in Japanese Utility Model Application Laid-open No. S50-101747 (1975), a drive plate or friction engaging element adjacent to a piston is provided with a pawl portion extending in an axial direction so that, by engaging the pawl portion with a groove or a hole formed in the piston, a relative rotation between a clutch housing and the piston is prevented.

Further, in Japanese Utility Model Application Laid-open No. S50-94345 (1975), by fitting a stop member attached to an outer periphery of a piston into a spline formed in a clutch housing, a relative rotation between the clutch housing and the piston is prevented.

However, as shown in the above-mentioned. Japanese Utility Model Application Laid-open No. S50-101747, if the pawl portion is provided on the drive plate, the pawl portion abuts against the groove of the piston repeatedly for preventing the relative rotation, with the result that the drive plate may be deformed due to impact or shock. If such deformation occurs, a normal or correct function of the friction engaging apparatus will be lost.

On the other hand, the above-mentioned Japanese Utility Model Application Laid-open No. S50-94345 causes a problem that the number of parts is increased because an additional member as the stop member is provided on the piston.

Further, in the above-mentioned Japanese Utility Model Application Laid-open No. S50-101747 and Japanese Utility Model Application Laid-open No. S50-94345, since the relative rotation is prevented by directly engaging the piston with the clutch housing, the relative rotation may not be prevented satisfactorily.

SUMMARY OF THE INVENTION

Accordingly, an object of the present invention is to provide a wet type multi-plate clutch which can prevent a relative rotation between a clutch housing and a piston with low cost and with a compact construction and which can prevent damage of an O-ring and members around the piston.

To achieve the above object, the present invention provides a wet type multi-plate clutch comprising a first friction engaging element coaxially arranged within a clutch housing, a second friction engaging element alternately disposed with the first friction engaging element, and a piston for applying an axial load to engage the first and second friction engaging elements with each other and wherein a projection protruding toward the piston is provided on the clutch housing and a recessed portion is provided in the piston so that a relative rotation between the clutch housing and the piston is prevented by engaging the projection with the recessed portion.

The present invention has the following advantages.

By engaging the projection provided on the clutch housing with the recessed portion of the piston, the relative rotation between the piston and the clutch housing can be prevented. As a result, the rotation of the piston is eliminated, thereby reducing wear of parts around the piston and thus preventing damage of such parts.

Further, by improving an O-ring portion, a compact and low cost wet type multi-plate clutch can be provided.

DESCRIPTION OF THE PREFERRED EMBODIMENTS

Figure 1:
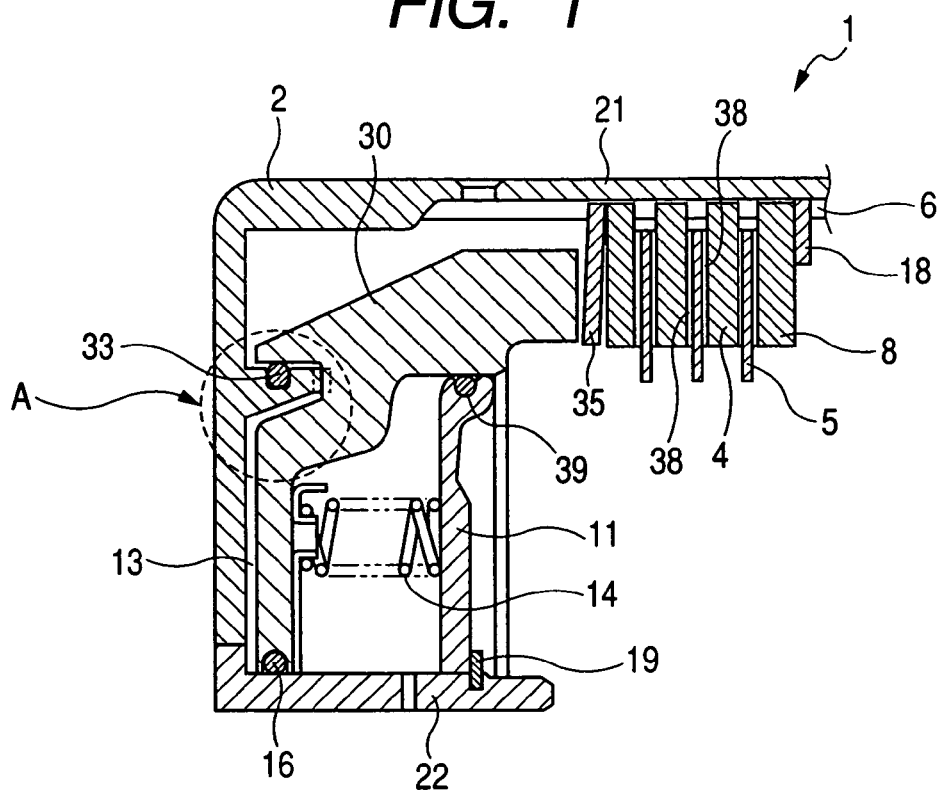
FIG. 1 is an axial sectional view showing a wet type multi-plate clutch according to an embodiment of the present invention.

Now, embodiments of the present invention will be fully explained with reference to the accompanying drawings. Incidentally, in the drawings, the same parts or elements are designated by the same reference numerals.

Figure 2:
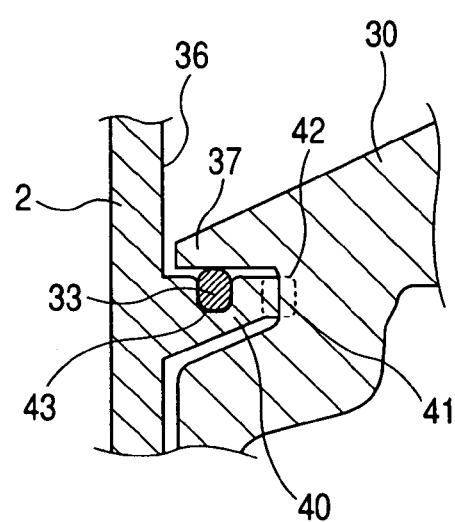
FIG. 2 is an enlarged view of a portion shown by a circle A in FIG. 1.

FIG. 1 is an axial sectional view showing a wet type multi-plate clutch 1 according to an embodiment of the present invention, and FIG. 2 is an enlarged view of a portion shown by a circle A in FIG. 1.

In the wet type multi-plate clutch 1, a clutch housing 2 and a hub (not shown) are arranged on a common axis. A spline 6 is formed in an inner peripheral surface of an outer cylindrical portion 21 of the clutch housing 2 and separator plates 4 as first friction engaging elements are received in the spline, and friction plates as second friction engaging elements are received in a spline formed in an outer periphery of the hub (not shown) in such a manner that the separator plates and the friction plates are alternately arranged on a common axis. Friction materials 38 are secured to both surfaces of each friction plate 5.

Within an axial open end portion of the clutch housing 2, there is disposed a backing plate 8 having an axial thickness greater than that of the separator plate 4. By means of a stop ring 18, these friction engaging elements are prevented from dislodging from the clutch housing and axial movements of the friction engaging elements are regulated.

On the other hand, within an axial closed end portion of the clutch housing 2, there is disposed a piston 30. A wave spring 35 is arranged between the piston 30 and the adjacent separator plate 4. When oil pressure is supplied into an oil chamber 13 defined between the piston and an inner wall of the clutch housing 2, the piston is shifted to the right in FIG. 1. Oil for the oil pressure is supplied to the oil chamber 13 through an oil port (not shown).

In order to prevent oil leakage, i.e. in order to maintain the oil chamber 13 in an oil-tight condition, a seal ring 33 is provided between the piston 30 and the clutch housing 2 and a seal 16 is provided in an inner cylindrical portion 22 of the clutch housing 2. Further, when the oil pressure is released from the oil chamber 13, the piston 30 is pushed back by a repelling force of a return spring 14, thereby releasing or disengaging the friction engaging elements. The return spring 14 is supported by a snap ring 19 through a canceller 11 fitted in the piston 30 with the interposition of an O-ring 39.

Now, an engaging relationship between the piston 30 and the clutch housing 2 will be explained with reference to FIG. 2. An annular projection 40 protruding toward the piston 30 is provided on an inner surface 36 of the closed end of the clutch housing 2. The projection 40 is provided at its distal end with pawl portions 41. A plurality of such pawl portions 41 are equidistantly arranged along a circumferential direction at predetermined positions. Further, an annular groove 43 is formed in an outer diameter side of the projection and the O-ring 33 is disposed in the groove.

Figure 3:
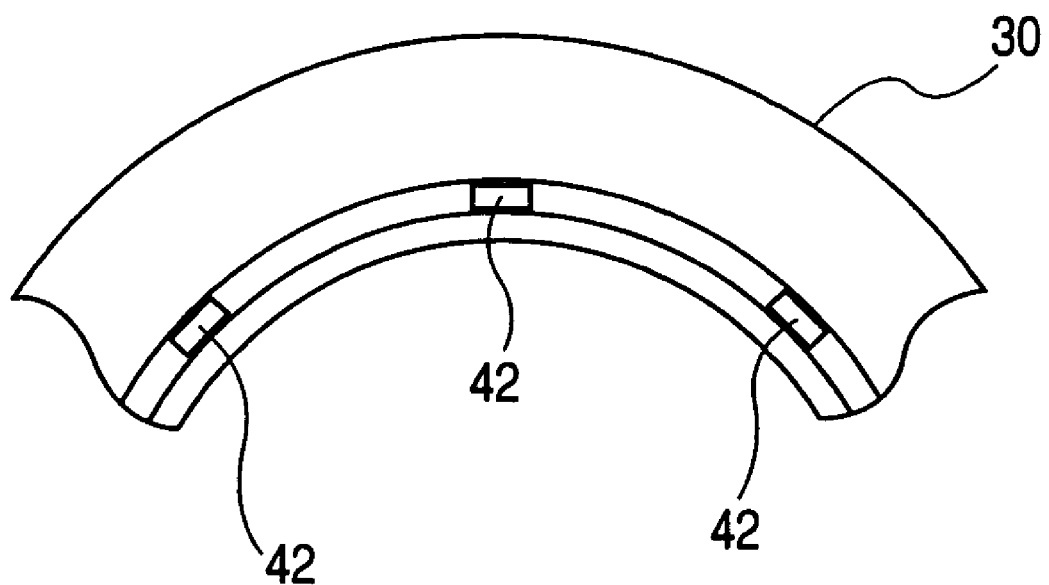
FIG. 3 is a partial front view of a piston.

On the other hand, recessed portions 42 are formed in the piston 30 in a confronting relationship to the projection 40. FIG. 3 is a partial front view of the piston 30. As shown in FIG. 3, a plurality of such recessed portions 42 of the piston 30 are equidistantly arranged along the circumferential direction; and the number of the recessed portions corresponds to the number of the pawl portions 41.

With this arrangement, when the pawl portions 41 of the projection 40 of the clutch housing 2 are engaged with the recessed portions 42 of the piston 30, a relative rotation between the clutch housing 2 and the piston 30 is prevented. Accordingly, even if the friction engaging elements are rotated, the piston 30 is not rotated by the rotation of the elements, with the result that wear of various parts including the O-rings 33, 16 and 39 can be reduced.

As can be seen from FIG. 2, the piston 30 is provided with an extension 37 extending in opposed to the inner surface 36 of the clutch housing 2. The projection 40 of the clutch housing 2 is disposed in an annular space inside the extension 37. The O-ring 33 fitted in the groove 43 of the projection 40 is contacted with an inner surface of the extension 37 in an oil-tight manner, thereby maintaining the oil chamber 13 in the oil-tight condition.

Further, if necessary, at least a part of each pawl portion 41 can be covered by resin material. In this case, a friction property of the pawl portion can be enhanced, thereby preventing or reducing wear.

In the embodiment described above, while an example that the projection 40 is provided on the clutch housing 2 and the recessed portions 42 are provided in the piston 30 was explained, a reverse arrangement can be used. That is to say, the recessed portions may be provided in the clutch housing 2 and the projection to be fitted in the recessed portions may be provided in the piston 30.

What is claimed is:

1. A wet type multi-plate clutch comprising a first friction engaging element coaxially arranged within a clutch housing, a second friction engaging element alternately disposed with said first friction engaging element, and a piston for applying an axial load to engage said first and second friction engaging elements with each other, said piston being provided in said clutch housing and at a side of a closed end of said clutch housing, wherein a projection having an axially extending pawl portion and axially protruding toward said piston is provided on said clutch housing and a recessed portion is provided in said piston so that a relative rotation between said clutch housing and said piston is prevented by engaging said pawl portion with said recessed portion.

2. A wet type multi-plate clutch according to claim 1, wherein said projection is provided with a distal end capable of engaging with said recessed portion.

3. A wet type multi-plate clutch according to claim 2, wherein said distal end is covered by resin material.

4. A wet type multi-plate clutch according to claim 1, wherein said projection is integral with the closed end of the clutch housing.

5. A wet type multi-plate clutch comprising a first friction engaging element coaxially arranged within a clutch housing, a second friction engaging element alternately disposed with said first friction engaging element, and a piston for applying an axial load to engage said first and second friction engaging elements with each other, said piston being provided in said clutch housing and at a side of a closed end of said clutch housing, wherein a projection having an axially extending pawl portion and axially protruding toward said piston is provided on the closed end of said clutch housing and a recessed portion is provided in said piston so that relative rotation between said clutch housing and said piston is prevented by engaging said pawl portion with said recessed portion.

6. A wet type multi-plate clutch according to claim 5, wherein the projection is annular and there are a plurality of pawl portions spaced circumferentially along the annular projection and there are a plurality of the recessed portions engaged by respective pawl portions.

7. A wet type multi-plate clutch according to claim 5, wherein said projection is integral with the clutch housing.

* * * * *